United States Patent
Braemer

[15] 3,638,925
[45] Feb. 1, 1972

[54] ADJUSTABLE ANNULAR VENTURI SCRUBBER

[72] Inventor: Frank C. Braemer, Teaneck, N.J.
[73] Assignee: Chemical Construction Corporation, New York, N.Y.
[22] Filed: July 22, 1969
[21] Appl. No.: 843,444

[52] U.S. Cl. .................................261/62, 55/226, 138/46, 261/109, 261/112, 261/DIG. 54
[51] Int. Cl. .........................................B01d 47/10
[58] Field of Search ..........................138/43, 45, 46; 55/226; 261/108–112, 62, DIG. 54

[56] References Cited

UNITED STATES PATENTS

| | | | |
|---|---|---|---|
| 2,828,951 | 4/1958 | De La Fourniere | 261/DIG. 54 |
| 2,948,296 | 8/1960 | Thorburn | 138/46 X |
| 3,085,793 | 4/1963 | Pike et al. | 261/112 |
| 3,317,197 | 5/1967 | Lohner et al. | 261/DIG. 54 |
| 3,406,500 | 10/1968 | Deming | 261/112 X |

Primary Examiner—Tim R. Miles
Assistant Examiner—Steven H. Markavitz
Attorney—J. L. Chaboty

[57] ABSTRACT

An annular venturi scrubber for scrubbing an impurity-laden gas stream with a liquid, in which spaced horizontal baffles are provided at the base of the central conical baffle and the lower extremity of the approach section, with the conical baffle being rotatable or adjustable about a vertical axis, so that the throat opening may be modified to compensate for changes in the gas flow rate.

9 Claims, 7 Drawing Figures

FRANK C. BRAEMER
INVENTOR.

3,638,925

FRANK C. BRAEMER
INVENTOR.

BY _____
AGENT

PATENTED FEB 1 1972

FRANK C. BRAEMER

INVENTOR.

BY *J. J. Chaloty*

AGENT 3,638,925

ADJUSTABLE ANNULAR VENTURI SCRUBBER

BACKGROUND OF THE INVENTION

1. Field of the Invention

The invention relates to the scrubbing of impurity-laden gas streams, such as stack or flue gases, waste gases from metallurgical processes or furnaces, off-gases from chemical plants or processes, combustion gases from incinerators, power plants, or the like, to remove entrained solid particles or liquid droplets, or vaporous or gaseous components or the like impurities or components from the gas stream, prior to further usage of the gas stream or discharge of the scrubbed gas stream to the atmosphere. The scrubbing liquid may consist of water or an aqueous medium or solution, or other suitable scrubbing liquid, and a major application of the present invention relates to the scrubbing of waster gases prior to discharge to the atmosphere, so as to prevent air pollution by removal of objectionable solid, liquid or gaseous impurities from the waste gas stream and thereby render the gas stream relatively innocuous prior to discharge to the atmosphere. Other applications of the present invention will include the scrubbing of process gas streams in chemical and metallurgical processes, so as to remove and/or recover selected impurities or components.

2. Description of the Prior Art

Numerous types of apparatus and devices have been suggested for usage in scrubbing an impurity-laden gas stream with a scrubbing liquid. One important type of apparatus utilized for this purpose operates on the venturi principle, in which the gas stream is accelerated to a high velocity in a passage of venturi configuration, and a scrubbing liquid is injected or projected into the gas stream at the throat of the venturi, which is the region of maximum gas velocity. A typical venturi type of scrubber is shown in British Pat. No. 911,271. Parallel venturi passage scrubbers are shown in Canadian Pat. Nos. 788,802 and 751,209, U.S. Pat. Nos. 3,347,024; 3,339,344; 3,181,287 and 2,797,904 and U.S. Pat. application No. 643,098 filed June 2, 1967 and now issued as U.S. Pat. NO. 3,440,803. Annular venturi passage scrubbers are shown in British Pat. No. 1,100,295; Canadian Pat. No. 749,764; U.S. Pat. Nos. 3,317,197; 3,191,364; 3,085,793; 2,869,674; 2,621,754 and U.S. Pat. application Nos. 753,583 filed Aug. 19, 1968 and issued as U.S. Pat. No. 3,544,803 and No. 808,517 filed Mar. 19, 1969 and now allowed.

SUMMARY OF THE INVENTION

In the present invention, an apparatus for venturi throat area adjustment has been devised which will permit coplanar liquid introduction while preserving the basic scrubbing mechanism of the wet approach annular venturi. The central cone or conical baffle of the annular venturi is preferably supported from below by means of a vertical pipe or shaft which is generally coaxial with the conical baffle. This shaft, rather than moving vertically to alter throat cross-sectional area, instead is rotated through a relatively small angle, causing the central cone or plumb bob shaped element to rotate through the same angle.

Equally spaced projections or restrictor plates in the form of flat horizontal baffles are attached to the central cone. These projections cause the gas to pass through the intermediate spaces, thus subdividing the throat into a multitude of smaller venturi throat passages. Immediately beneath or above these projections are a second set of restriction plates, preferably of identical size, but these are attached at or adjacent to the lower extremity of the fixed outer converging section, or inverted frustoconical approached baffle. Area adjustment is then made by a slight rotation of the support shaft and central cone assembly, causing rotational displacement of the projecting restrictor plates, which uncover a portion of the stationary restrictor plates beneath, thus presenting a greater total of restricted area to the gas stream. In this manner, up to 100 percent restriction can be accomplished if desired.

In practice, it is immaterial whether the upper restrictor plates are attached to the fixed approach baffle or the movable cone. The number and size of the restrictor plates is determined in application of the invention by design requirements of percent restriction required and angular displacement necessary. Possible abrasion of these plates will require mechanical design details and consideration in some cases. Thus, it may be necessary in some instances to design the restrictor plates in a plow shaped necessary in some instances to design the restrictor plates in a plow-shaped fashion, with a raised central longitudinal projection, to divert the cascading scrubbing water into the multitude of venturi throats. In a preferred embodiment, the liquid is introduced onto the central cone employing a novel apparatus arrangement, since direct pouring from an open pipe could result in poor distribution leading to dry spots on the conical surface. The liquid is introduced tangentially into a coaxial cylindrical baffle disposed above the apex of the central cone. Centrifugal force is thus utilized to distribute the liquid in an efficient and uniform manner. Axial entry by means of a vertically disposed bypass pipe coaxially oriented within the cylindrical baffle is also employed in instances when centrifugal force causes too little liquid contact with the cone.

The principal advantage of the present invention is that the apparatus and venturi throat openings are adjustable, to compensate for variations and changes in gas flow rate. Another advantage is that high scrubbing efficiency and removal of entrained impurities from the gas stream is attained. The entrained impurity may consist of entrained solid particles such as fly ash, liquid droplets, or a vaporous or gaseous component of the gas stream or the like. Finally, the adjustable venturi of the present invention is advantageous compared to venturi scrubbers in which the central cone is displaced vertically for adjustment, since such displacement results in introduction of the liquid into the gas stream at different horizontal planes. The greater vertical displacement thus increases possibilities of dirty gas bypass.

It is an object of the present invention to provide an improved apparatus for scrubbing a gas stream with a liquid to remove entrained impurity from the gas stream.

Another object is to provide an improved apparatus for scrubbing waste gases with a liquid to remove contaminants and thereby prevent air pollution.

A further object is to provide an improved adjustable venturi gas scrubber which may be readily adjusted or modified to compensate for changes or fluctuations in gas flow rate.

An additional object is to provide an improved annular venturi gas scrubber with an adjustable throat.

Still another object is to scrub gas streams with a liquid for impurity removal in an improved manner.

These and other objects and advantages of the present invention will become evident from the description which follows.

DESCRIPTION OF THE DRAWINGS AND PREFERRED EMBODIMENTS

Referring now to the drawings

Figure 4:
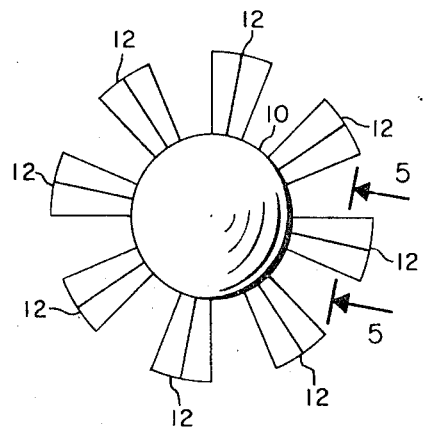
Figure 5:
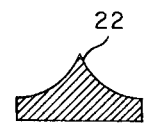
Figure 6:
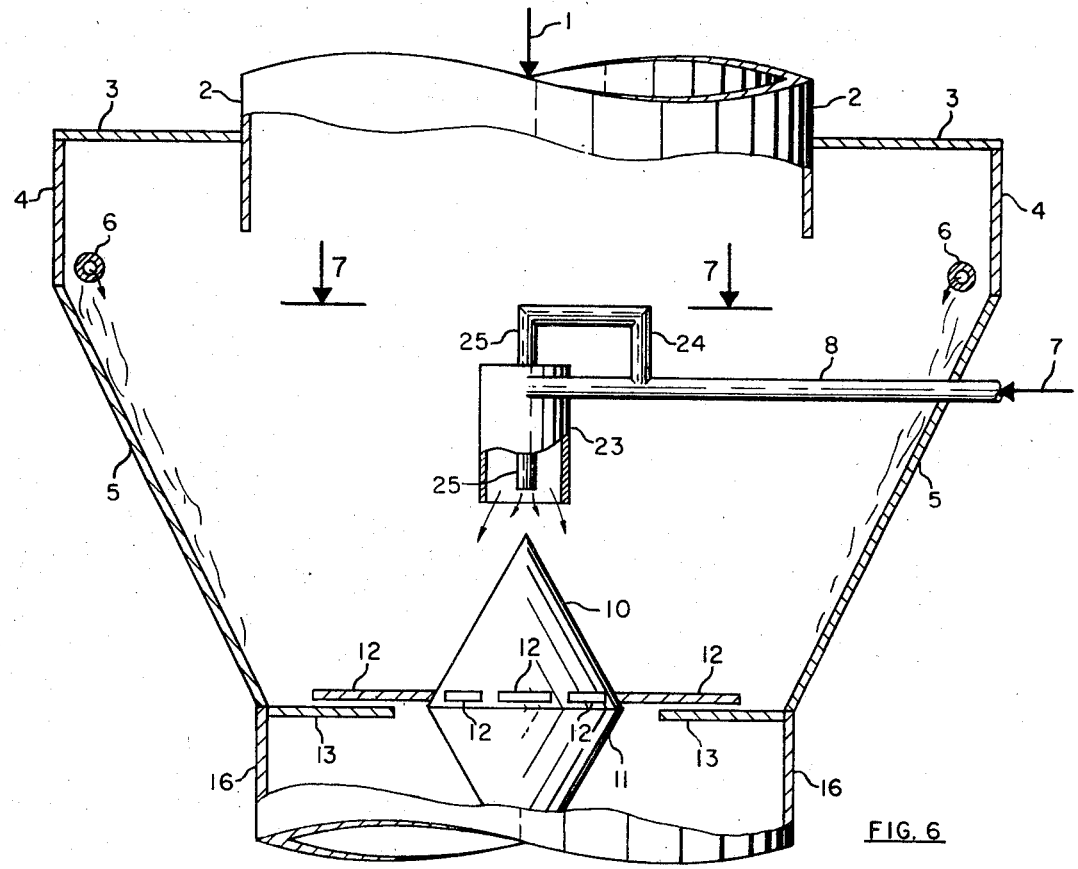
Figure 7:
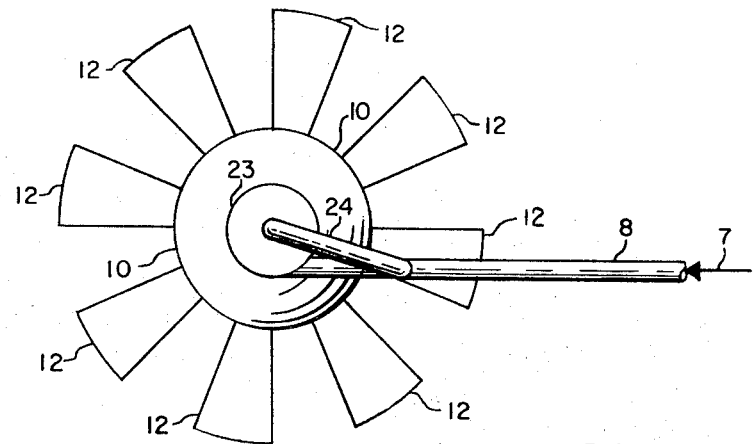

FIG. 4 is a plan view of an alternative embodiment of a portion of the apparatus of the present invention, FIG. 5 is a sectional elevation view of a portion of FIG. 4, taken on section 5—5, FIG. 6 is a sectional elevation view of an alternative embodiment of the approach section of the invention, showing improved apparatus for dispersal of scrubbing liquid onto the central vertical cone, and FIG. 7 is a sectional plan view of FIG. 6, taken on section 7—7.

Figure 1:
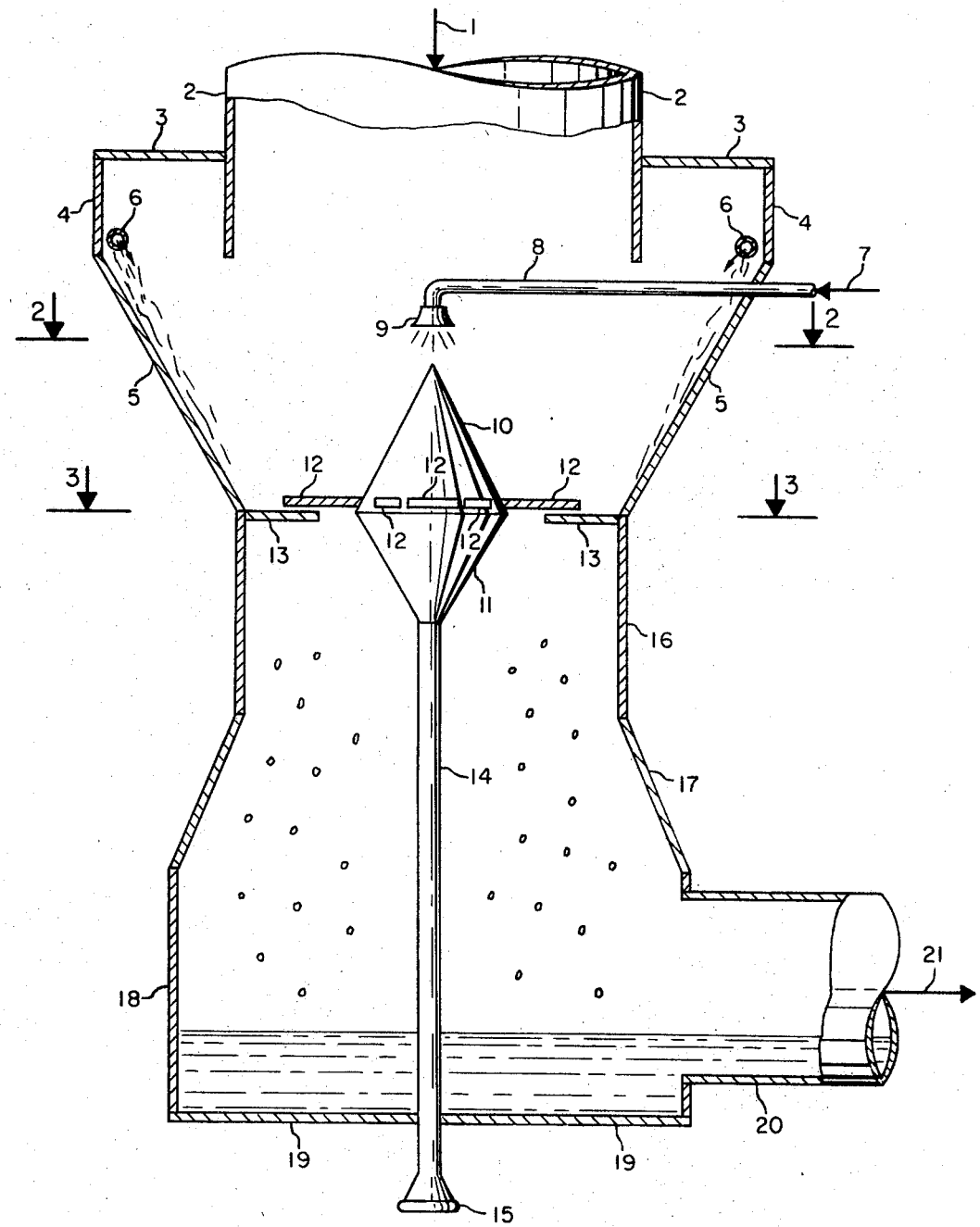
FIG. 1 is a sectional elevation view of one embodiment of the invention.

Referring now to FIG. 1, dirty gas stream 1 laden with entrained solid, liquid, vaporous or gaseous impurity or any combination of such impurities is passed downwards through the vertically oriented conduit 2. An annular flat horizontal baffle 3 extends outwards from the outer perimeter of conduit 2, and a cylindrical baffle 4 depends downwards from the outer perimeter of baffle 3. The approach section of the venturi scrubber is defined by the inverted frustoconical baffle 5 which depends downwards from baffle 4. One or a plurality of substantially horizontal pipes 6 are preferably tangentially oriented adjacent to the upper inner surface of baffle 5, or adjacent to baffle 4. A horizontal liquid dispersal shelf, not shown, may be provided between baffles 4 and 5, with pipes 6 discharging a scrubbing liquid stream such as water onto the shelf for overflow down the inner surface of baffle 5. In any case, the pipes 6 discharge scrubbing liquid streams so that scrubbing liquid flows downwards on the inner surface of baffle 5.

An additional scrubbing liquid stream 7 is passed into the apparatus via pipe 8, which extends into the approach section through baffle 5 and terminates at the downwardly oriented spray nozzle 9. Liquid stream 7 is thus sprayed downwards via nozzle 9, which is oriented at or above the apex of the upright central cone or conical baffle 10, which is coaxial with baffle 5. An inverted cone or conical baffle 11 is preferably also provided, with baffle 11 depending downwards from baffle 10 and the respective bases of baffles 10 and 11 being joined or connected.

A plurality of spaced-apart flat horizontal baffles 12 extend radially outwards from the base of baffle 10 and partially overlap the plurality of spaced-apart flat horizontal baffles 13, which extend radially inwards from the lower terminus of baffle 5, or from proximity to the lower terminus of baffle 5. The coaction of baffles 12 and 13 restricts the throat section of the venturi passage in an adjustable manner, with vertical shaft or pipe 14 depending downwards from the lower apex of baffle 11 to lower adjustment or rotation means 15, which may consist of a handwheel or suitable gearing for circular movement of shaft 14, which in turn adjusts baffles 11 and 10 in a circular or rotary fashion and thus alters the position of baffles 12 relative to baffles 13 to thereby attain any desired degree or amount of venturi throat opening.

The venturi throat passage is further defined by the vertical cylindrical baffle 16, which depends downwards from the lower terminus of baffle 5. The scrubbing liquid streams flowing downwards on the inner wall of baffle 5 and outer surface of cone 10 are projected into the gas stream by the respective baffles 13 and 12, and since the gas stream has been accelerated to a high velocity in this region by the convergence of baffle 5 and divergence of conical baffle 10, which form an annular venturi approach passage, the liquid is dispersed into small droplets upon projection into the gas stream, and a rapid and complete scrubbing effect is attained adjacent to baffles 12 and 13 within the venturi throat 16.

A frustoconical divergence section baffle 17 depends downwards from baffle 16, for uniform recovery of gas pressure drop without turbulence. Baffle 17 is preferably provided to recover gas pressure drop, in order to minimize gas pressure loss through the device and thus reduce the power requirement for appropriate fans or blowers which move the gas stream through the system. The vertical cylindrical baffle 18 depending downwards from baffle 17, and the lower circular baffle 19, serve to define a chamber for separating liquid droplets from the gas stream, with a lower liquid retention section being maintained within the baffle 18 to provide a flooded section for liquid entrainment. A lateral horizontal conduit 20 is provided, extending from baffle 18 for removal of the scrubbed gas stream 21, together with excess scrubbing liquid. The conduit 20 is spaced above the lower end of baffle 18, to provide a lower flooded liquid retention section as mentioned supra.

Figure 2:
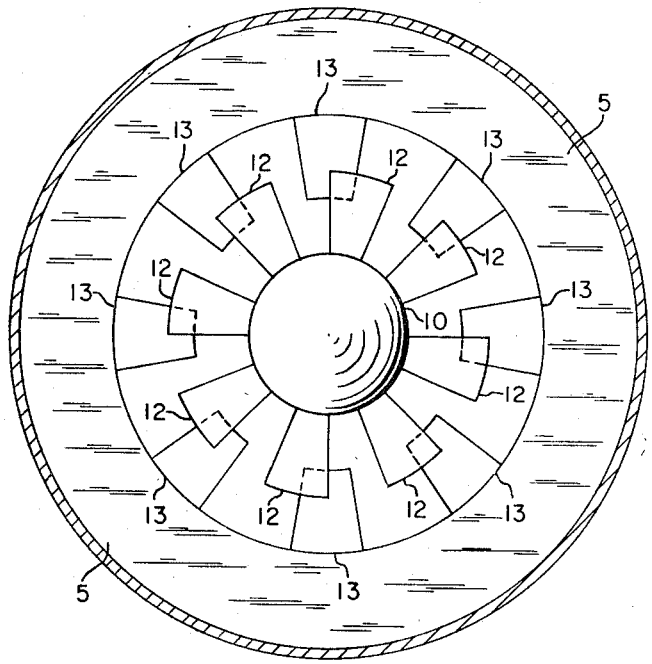
FIG. 2 is a plan view of FIG. 1, taken on section 2—2.

FIG. 2 is a sectional plan view of FIG. 1, and shows the orientation of the radial horizontal baffles 12 and 13, which cooperate to provide the venturi throat restriction adjustment, depending on the position to which the central conical baffle 10 is rotated. The baffles 12 overlap the baffles 13 to a degree which depends on the rotary or circular adjustment of the central conical baffle 10.

Figure 3:
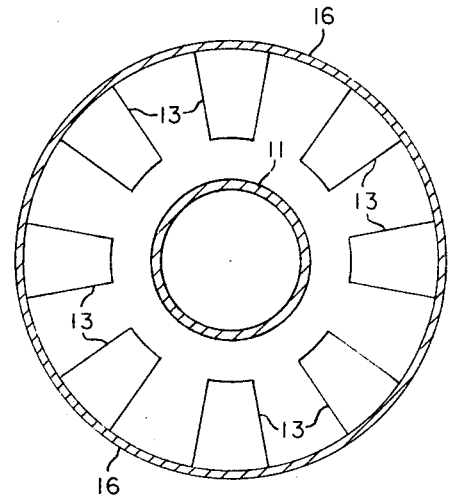
FIG. 3 is another plan view of FIG. 1, taken on section 3—3.

FIG. 3 is a plan view of FIG. 1, taken on section 3—3, and shows the spaced-apart annular baffles 13 which extend radially inward from the upper end of the cylindrical baffle 16 adjacent to baffle 5 and terminate adjacent to the base of the inverted conical baffle 11.

FIG. 4 is a plan view which shows an alternative embodiment of the upper central cone 10 and attached radial baffles 12, in which the baffles 12 are made plow shaped by the provision of an upper central longitudinal projection, shown as element 22 in FIG. 5, which is a sectional elevation view of FIG. 4 taken on section 5—5. The upper projection 22 extends centrally in a linear fashion above the longitudinal axis of baffles 12, and the projection 22 is preferably further defined by the two concave surfaces shown on FIG. 5 which slope downwards and outwards from projection 22 to the outer side extremities of baffles 12.

Referring now to FIG. 6, a sectional elevation view of an alternative embodiment of apparatus for dispersing scrubbing liquid on the outer surface of central upright cone 10 is shown. The scrubbing liquid stream 7 flows inwards through pipe 8, which extends in a linear direction tangentially to the inner surface of the vertical cylindrical baffle 23, which is coaxially disposed above the central apex of baffle 10. A scrubbing liquid portion is thus tangentially discharged within cylindrical baffle 23, and flows downwards under the influence of gravity with a whirling circular motion, and is uniformly projected onto the surface of baffle 10 due to centrifugal force. A bypass pipe 24 extends from pipe 8, and transmits a portion of the scrubbing liquid to the vertically oriented central pipe 25, which is coaxial with baffle 23 and cone 10 and spaced above the apex of cone 10. Scrubbing liquid is discharged from pipe 25 onto the apex of cone 10. The upper end of baffle 23 may be closed with a circular baffle, not shown, which would be centrally perforated to accommodate pipe 25, or alternatively the upper end of cylindrical baffle 23 may be open to permit gas flow downwards through baffle 23. The balance of the structure of FIG. 6 is comparable to FIG. 1 described supra.

FIG. 7 is a plan view of a portion of FIG. 6 and shows the concentric coaxial nature of cylindrical baffle 23 and cone 10, tangential connection of pipe 8 to baffle 23, and bypass pipe 24.

Numerous alternatives within the scope of the present invention, besides those alternatives mentioned supra, will occur to those skilled in the art. Referring to FIG. 1, other alternative apparatus for uniformly dispersing scrubbing liquid on the inner surface of baffle 5 may be provided in practice, instead of pipes 6. Thus, a flooded weir which may be notched may be provided for this purpose. The spray nozzle 9 may be a bull nozzle or other type of liquid ejection nozzle known to the art, and nozzle 9 may be mounted at a higher elevation and in the lower extremity of conduit 2 in some cases. A plurality of spray nozzles may be provided in practice, with a central nozzle spraying directly onto the apex of cone 10 together with auxiliary annular nozzles. Cones 10 and 11 may be spaced apart in some instances, and joined by a vertical cylindrical baffle spaced coaxially within baffle 16. The relative positions of baffles 12 and 13 may be reversed in suitable instances, with baffles 13 being the upper baffles and overlapping baffles 12. The cone 11 may be omitted in some cases, with shaft 14 extending directly to a suitable support connection with the base of cone 10. Shaft 14 and/or handwheel 15 may be replaced in some instances by suitable functionally equivalent apparatus elements, which may extend laterally, horizontally or at an upwards angle to cones 10 and 11, and which would serve to adjust or rotate the central conical members in a circular degree as desired. The diverging section baffle 17 may be omitted in some cases, such as when pressure drop recovery is not a major design factor, with conduit or baffle 16 extending directly to a linear connection with element 18.

I claim:

1. An apparatus for scrubbing an impurity-laden gas stream with a scrubbing liquid which comprises an inverted frustoconical baffle, means to pass an impurity-laden gas stream downwards through said inverted frustoconical baffle, a conical baffle, said conical baffle being coaxial with said inverted frustoconical baffle and disposed centrally within said inverted frustoconical baffle, with the apex of said conical baffle extending upwards and opposed to downwards gas flow, and with the base of said conical baffle being spaced from the lower terminus of said inverted-frustoconical baffle, whereby an annular venturi passage for downwards gas flow is defined between said conical baffle and said inverted frustoconical baffle, a first plurality of horizontal baffles, said first baffles being spaced apart and extending radially outwards from the base of said conical baffle, a second plurality of horizontal baffles, said second baffles being spaced apart and extending radially inwards from the lower terminus of said inverted frustoconical baffle, with at least a portion of each of said first plurality of baffles being parallel with and spaced from a portion of one of said second plurality of baffles, means to pass a first scrubbing liquid stream downwards on the outer surface of said conical baffle, whereby said first scrubbing liquid stream is projected outwards at the base of said conical baffle and into said gas stream, means to pass a second scrubbing liquid stream downwards on the inner surface of said inverted frustoconical baffle, whereby said second scrubbing liquid stream is projected inwards at the lower terminus of said inverted frustoconical baffle and into said gas stream, means to support said conical baffle, said support means being adjustable about a vertical axis whereby said conical baffle is movable in a rotary direction about a central vertical axis and the openings for vertically downward gas flow between said first and said second baffles may be adjusted to compensate for variation in gas flow rate, and a cylindrical baffle, said cylindrical baffle depending downwards from the terminus of said inverted frustoconical baffle to means for separation of the scrubbed gas stream for scrubbing liquid laden with impurity removed from said gas stream.

2. The apparatus in claim 1, in which said support means includes a vertical shaft, said shaft depending coaxially downwards from said conical baffle to lower means for rotation of said shaft about a central vertical axis.

3. The apparatus of claim 1, in which an inverted conical baffle depends downwards from said conical baffle.

4. The apparatus of claim 1, in which said means to pass said first scrubbing liquid stream downwards on the outer surface of said conical baffle includes a pipe, said pipe extending into said inverted frustoconical baffle above said conical baffle, together with a vertical spray nozzle disposed at the inner terminus of said pipe above the upper apex of said conical baffle, whereby said first scrubbing liquid stream is sprayed downwards onto said conical baffle.

5. The apparatus of claim 1, in which said means to pass said first scrubbing liquid stream downwards on the outer surface of said conical baffle comprises a vertical cylindrical baffle coaxially disposed above the apex of said conical baffle, means to pass a portion of said first scrubbing liquid stream tangentially into said cylindrical baffle, whereby scrubbing liquid flows downwards on the inner surface of said cylindrical baffle in a whirling circular flow path and is uniformly projected onto the outer surface of said conical baffle, together with a central vertical pipe within said cylindrical baffle, said central vertical pipe being coaxially disposed above the apex of said conical baffle, and means to pass the balance of said first scrubbing liquid stream downwards through said central vertical pipe, whereby the balance of said first scrubbing liquid stream impinges on the apex of said conical baffle and thereafter flows downwards on the outer surface of said conical baffle.

6. The apparatus of claim 1, in which said means to pass said second scrubbing liquid stream downwards on the inner surface of said inverted frustoconical baffle comprises a plurality of substantially horizontal liquid supply pipes, said pipes being disposed adjacent to the upper terminus of said inverted frustoconical baffle and being substantially tangential to said inverted frustoconical baffle, whereby second scrubbing liquid flows downwards on the inner surface of said inverted frustoconical baffle in a whirling circular flow path.

7. The apparatus of claim 1, in which said first plurality of baffles extends outwards from said conical baffle above said second plurality of baffles, and each of said first plurality of baffles overlaps at least a portion of one of said second plurality of baffles.

8. The apparatus of claim 7, in which each of said first plurality of baffles is provided with a longitudinal raised central projection, the upper surface of each of said first plurality of baffles sloping downwards and outwards from said central projection.

9. The apparatus of claim 1, in which said first plurality of baffles and said second plurality of baffles are of identical dimension and are spaced equally apart.

* * * * *